United States Patent
Ulupinar et al.

(10) Patent No.: US 9,769,239 B2
(45) Date of Patent: Sep. 19, 2017

(54) SYSTEMS AND METHODS FOR USER AGENT SIGNALING REQUEST ACCELERATION BY TRANSPORT ACCELERATOR

(71) Applicant: QUALCOMM Incorporated, San Diego, CA (US)

(72) Inventors: Fatih Ulupinar, San Diego, CA (US); Punyaslok Purkayastha, San Diego, CA (US); Yinian Mao, San Diego, CA (US); Deviprasad Putchala, San Diego, CA (US); Lorenz Christoph Minder, Evanston, IL (US); Michael George Luby, Berkeley, CA (US)

(73) Assignee: QUALCOMM Incorporated, San Diego, CA (US)

( * ) Notice: Subject to any disclaimer, the term of this patent is extended or adjusted under 35 U.S.C. 154(b) by 462 days.

(21) Appl. No.: 14/616,233

(22) Filed: Feb. 6, 2015

(65) Prior Publication Data
US 2016/0094614 A1    Mar. 31, 2016

Related U.S. Application Data

(60) Provisional application No. 62/057,412, filed on Sep. 30, 2014.

(51) Int. Cl.
*G06F 15/16* (2006.01)
*H04L 29/08* (2006.01)
(Continued)

(52) U.S. Cl.
CPC .............. *H04L 67/02* (2013.01); *H04L 41/14* (2013.01); *H04L 65/4084* (2013.01); *H04L 65/80* (2013.01); *H04L 67/322* (2013.01)

(58) Field of Classification Search
CPC ....... H04L 67/02; H04L 67/322; H04L 65/80; H04L 65/4084; H04L 41/14
(Continued)

(56) References Cited

U.S. PATENT DOCUMENTS

| 5,940,817 A | * | 8/1999 | Kishi | .................. B61L 27/0027 |
| | | | | 706/45 |
| 7,840,700 B2 | | 11/2010 | Raghavan et al. | |

(Continued)

FOREIGN PATENT DOCUMENTS

WO    WO-2006074072 A2    7/2006

OTHER PUBLICATIONS

Seth A., et al., "A Policy-Oriented Architecture for Opportunistic Communication on Multiple Wireless Networks," IEEE Transactions on Mobile Computing, Aug. 2006, pp. 1-15.
(Continued)

*Primary Examiner* — Michael Y Won
(74) *Attorney, Agent, or Firm* — Norton Rose Fulbright LLP

(57) ABSTRACT

Systems and methods which are adapted to provide transport accelerator operation through the use of user agent (UA) signaling are disclosed. In operation according to embodiments, a transport accelerator (TA) analyzes content requests to determine if the content request includes an indication that transport acceleration functionality is to be provided. If such an indication is present, the TA further analyzes the content request to determine if transport acceleration functionality will be provided.

26 Claims, 2 Drawing Sheets

(51) Int. Cl.
*H04L 12/24* (2006.01)
*H04L 29/06* (2006.01)

(58) Field of Classification Search
USPC ........ 709/203, 228, 229, 232, 234, 235, 246
See application file for complete search history.

(56) References Cited

U.S. PATENT DOCUMENTS

| | | |
|---|---|---|
| 8,743,690 B1 | 6/2014 | Janarthanan et al. |
| 8,750,188 B2 | 6/2014 | Nicoara et al. |
| 8,838,095 B2 | 9/2014 | Jouin |
| 9,648,023 B2* | 5/2017 | Hoffman ............... H04L 63/102 |
| 2013/0024629 A1* | 1/2013 | Flanders ............. G06F 12/0831 |
| | | 711/146 |
| 2013/0297814 A1 | 11/2013 | Annamalaisami et al. |
| 2013/0304847 A1 | 11/2013 | Ewanchuk et al. |
| 2014/0047059 A1 | 2/2014 | Brownlow et al. |
| 2014/0101306 A1 | 4/2014 | Murgia |
| 2014/0304395 A1 | 10/2014 | Chandrayana et al. |
| 2014/0323178 A1 | 10/2014 | Wei et al. |
| 2016/0337426 A1* | 11/2016 | Shribman ........... H04L 65/4084 |

OTHER PUBLICATIONS

International Search Report and Written Opinion—PCT/US2015/047417—ISA/EPO—Nov. 20, 2015.

* cited by examiner

SYSTEMS AND METHODS FOR USER AGENT SIGNALING REQUEST ACCELERATION BY TRANSPORT ACCELERATOR

CROSS-REFERENCE TO RELATED APPLICATIONS

The present application claims priority to U.S. Provisional Patent Application No. 62/057,412, entitled "SYSTEMS AND METHODS FOR USER AGENT SIGNALING REQUEST ACCELERATION BY TRANSPORT ACCELERATOR," filed Sep. 30, 2014, the disclosure of which is hereby incorporated herein by reference.

DESCRIPTION OF THE RELATED ART

More and more content is being transferred over available communication networks. Often, this content includes numerous types of data including, for example, audio data, video data, image data, etc. Video content, particularly high resolution video content, often comprises a relatively large data file or other collection of data. Accordingly, a user agent (UA) on an end user device or other client device which is consuming such content often requests and receives a sequence of fragments of content comprising the desired video content. For example, a UA may comprise a client application or process executing on a user device that requests data, often multimedia data, and receives the requested data for further processing and possibly for display on the user device.

Many types of applications today rely on HTTP for the foregoing content delivery. In many such applications the performance of the HTTP transport is critical to the user's experience with the application. For example, live streaming has several constraints that can hinder the performance of a video streaming client. Two constraints stand out particularly. First, media segments become available one after another over time. This constraint prevents the client from continuously downloading a large portion of data, which in turn affects the accuracy of download rate estimate. Since most streaming clients operate on a "request-download-estimate", loop, the content download generally does not do well when the download estimate is inaccurate. Second, when viewing a live event streaming, users generally do not want to suffer a long delay from the actual live event timeline. Such a behavior prevents the streaming client from building up a large buffer, which in turn may cause more rebuffering.

If the streaming client operates over Transmission Control Protocol (TCP) (e.g., as do most Dynamic Adaptive Streaming over HTTP (DASH) clients), the foregoing stringent live event timeline contradicts with the typical TCP behavior, which is to slow down when there is a missing or re-ordered packet. The built-in TCP congestion control mechanism aggravates the rebuffering effect during live streaming, while viewers for a live event are more likely willing to skip the rebuffering and jump to the latest event timeline.

The same issues also exists for HTTP-based file download, where there is a deadline for completion of the download, otherwise a penalty is incurred. For example, if a user is trying to access a web page, a picture, or use a web-based application, large download latency can result in the user turning away from the web page or web-based application.

On-demand streaming also suffers from similar constraints. For example, in on-demand streaming the client devices wishes to receive the on-demand stream as fast as possible in the right order to provide playback to the user. The performance of streaming on-demand content is impacted by missing and re-ordered packets, rebuffering, etc.

Various techniques have been developed for providing acceleration with respect to the delivery of content using an implementation of a transport accelerator. Such transport accelerator implementations may, for example, operate to provide caching of data, processing of data requests and/or responses to data requests, etc. in an effort to facilitate expedited delivery of data to a client device. Although providing expedited delivery of data to client devices in some or even many situations, many transport accelerator implementations nevertheless result in undesirable operation in some situations. For example, operation of a transport accelerator can result in increased network congestion, incompatibilities with communication protocols or portions thereof, etc.

A transport accelerator may, for example, be implemented in a system framework (e.g., the STAGEFRIGHT media player architecture provided by the ANDROID mobile device operating system) to facilitate transport acceleration operation with respect to a number of applications. For example, an operating system (OS) may provide a system framework whereby certain lower level functions, such as HTTP layer transactions, network layer transactions, media playback engine, etc., are provided for use by applications, such as through the use of an application programming interface (API). Such a framework which is commonly available to a potentially large number of applications operating on the OS may be leveraged to likewise make functionality, such as the request and data delivery acceleration of a transport accelerator, likewise available to the applications which avail themselves of the framework services.

Some applications, however, may not use the functionality of such a system framework. For example, certain applications may implement their own lower level functions, such as HTTP layer transactions, network transactions, media playback, etc., in order to optimize those functions for operation of the applications. For example, relatively high network impact applications (e.g., the NETFLIX and YOUTUBE clients) may forego use of a system provided framework (e.g., STAGEFRIGHT), and instead implement their own lower level functionality. Accordingly, although requiring a more complex application software configuration, such applications may nevertheless benefit from improved or even more predictable performance through use of lower level functionality specifically adapted for use by the particular application.

SUMMARY

In accordance with embodiments herein, a method for transport acceleration request communication is provided. The method includes receiving, by a transport accelerator (TA), a content request via a first request acceleration port of the TA from a first user agent (UA), wherein the content request comprises a request for content data to be delivered to the UA by a content server. The method further includes analyzing the content request to determine if the content request includes signaling indicating that transport acceleration functionality is to be provided with respect to the content request and performing transport acceleration operation with respect to the content request based at least in part on a determination that the content request includes signaling indicating that transport acceleration functionality is to be provided, wherein the transport acceleration operation includes subdividing the content request into a plurality of requests for content, and controlling requesting the content from the content server by the TA to provide accelerated delivery of the requested content data to the TA.

In accordance with further embodiments herein, an apparatus for transport acceleration request communication is provided. The apparatus includes means for a transport accelerator (TA) receiving a content request via a first request acceleration port of the TA from a first user agent (UA), wherein the content request comprises a request for content data to be delivered to the UA by a content server. The apparatus further includes means for analyzing the content request to determine if the content request includes signaling indicating that transport acceleration functionality is to be provided with respect to the content request and means for performing transport acceleration operation with respect to the content request based at least in part on a determination that the content request includes signaling indicating that transport acceleration functionality is to be provided, wherein the transport acceleration operation includes subdividing the content request into a plurality of requests for content, and controlling requesting the content from the content server by the TA to provide accelerated delivery of the requested content data to the TA.

In accordance with still further embodiments herein, a computer readable medium storing computer executable code for transport acceleration request communication is provided, wherein the computer readable medium comprises a tangible computer-readable medium having program code recorded thereon. The program code includes program code to receive, by a transport accelerator (TA), a content request via a first request acceleration port of the TA from a first user agent (UA), wherein the content request comprises a request for content data to be delivered to the UA by a content server. The program code further includes program code to analyze the content request to determine if the content request includes signaling indicating that transport acceleration functionality is to be provided with respect to the content request and program code to perform transport acceleration operation with respect to the content request based at least in part on a determination that the content request includes signaling indicating that transport acceleration functionality is to be provided, wherein the transport acceleration operation includes subdividing the content request into a plurality of requests for content, and controlling requesting the content from the content server by the TA to provide accelerated delivery of the requested content data to the TA.

In accordance with further embodiments herein, an apparatus for transport acceleration request communication is provided. The apparatus comprises at least one processor, and a memory coupled to said at least one processor. The at least one processor is configured to receive, by a transport accelerator (TA), a content request via a first request acceleration port of the TA from a first user agent (UA), wherein the content request comprises a request for content data to be delivered to the UA by a content server. The at least one processor is further configured to analyze the content request to determine if the content request includes signaling indicating that transport acceleration functionality is to be provided with respect to the content request and to perform transport acceleration operation with respect to the content request based at least in part on a determination that the content request includes signaling indicating that transport acceleration functionality is to be provided, wherein the transport acceleration operation includes subdividing the content request into a plurality of requests for content, and controlling requesting the content from the content server by the TA to provide accelerated delivery of the requested content data to the TA.

DETAILED DESCRIPTION

Figure 1:
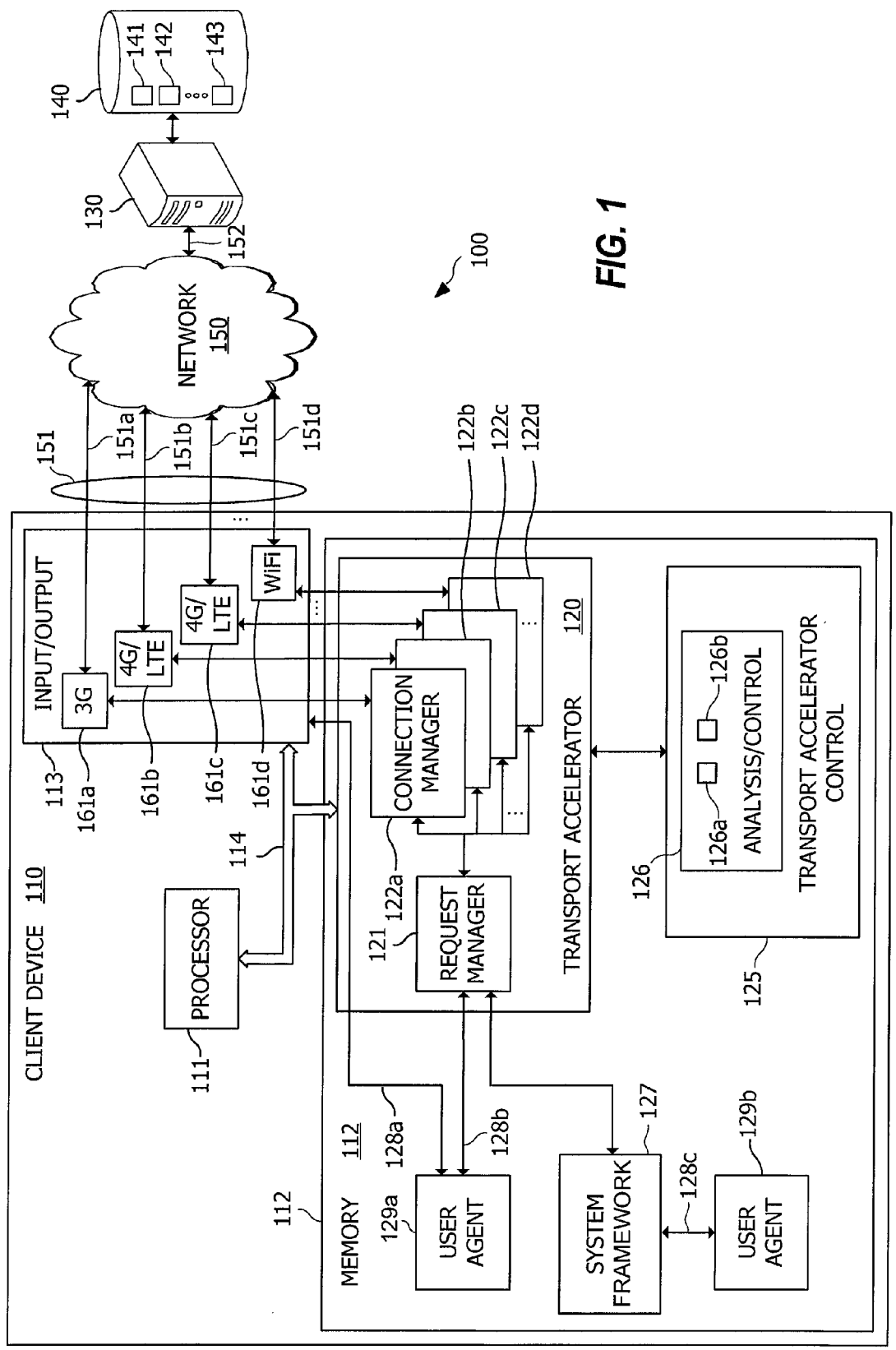
FIG. 1 shows a system adapted for transport accelerator operation according to embodiments of the present disclosure.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the term "content" may include data having video, audio, combinations of video and audio, or other data at one or more quality levels, the quality level determined by bit rate, resolution, or other factors. The content may also include executable content, such as: object code, scripts, byte code, markup language files, and patches. In addition, "content" may also include files that are not executable in nature, such as documents that may need to be opened or other data files that need to be accessed.

As used in this description, the term "fragment" refers to one or more portions of content that may be requested by and/or received at a user device.

As used in this description, the term "streaming content" refers to content that may be sent from a server device and received at a user device according to one or more standards that enable the real-time transfer of content or transfer of content over a period of time. Examples of streaming content standards include those that support de-interleaved (or multiple) channels and those that do not support de-interleaved (or multiple) channels.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon.

The components may communicate by way of local and/or remote processes such as in accordance with a signal having one or more data packets (e.g., data from one component interacting with another component in a local system, distributed system, and/or across a network such as the Internet with other systems by way of the signal).

As used herein, the terms "user equipment," "user device," and "client device" include devices capable of requesting and receiving content from a web server and transmitting information to a web server. Such devices can be a stationary devices or mobile devices. The terms "user equipment," "user device," and "client device" can be used interchangeably.

As used herein, the term "user" refers to an individual receiving content on a user device or on a client device and transmitting information to a website.

FIG. 1 shows an embodiment of system 100 adapted according to the concepts herein to provide transfer of content, such as may comprise audio data, video data, image data, file data, etc., over communication networks. Accordingly, client device 110 is shown in communication with server 130 via network 150, whereby server 130 may transfer various content stored in database 140 to client device 110 in accordance with the concepts of the present disclosure. It should be appreciated that, although only a single client device and a single server and database are represented in FIG. 1, system 100 may comprise a plurality of any or all such devices. For example, server 130 may comprise a server of a server farm, wherein a plurality of servers may be disposed centrally and/or in a distributed configuration, to serve high levels of demand for content transfer. Alternatively, server 130 may be collocated on the same device as transport accelerator (TA) 120 (e.g., connected to TA 120 directly through I/O element 113, instead of through network 150) such as when some or all of the content resides in a database 140 (cache) that is also collocated on the device and provided to TA 120 through server 130. Likewise, users may possess a plurality of client devices and/or a plurality of users may each possess one or more client devices, any or all of which are adapted for content transfer according to the concepts herein.

Client device 110 may comprise various configurations of devices operable to receive transfer of content via network 150. For example, client device 110 may comprise a wired device, a wireless device, a personal computing device, a tablet or pad computing device, a portable cellular telephone, a WiFi enabled device, a Bluetooth enabled device, a television, a pair of glasses having a display, a pair of augmented reality glasses, or any other communication, computing or interface device connected to network 150 which can communicate with server 130 using any available methodology or infrastructure. Client device 110 is referred to as a "client device" because it can function as, or be connected to, a device that functions as a client of server 130.

Client device 110 of the illustrated embodiment comprises a plurality of functional blocks, shown here as including processor 111, memory 112, and input/output (I/O) element 113. Although not shown in the representation in FIG. 1 for simplicity, client device 110 may comprise additional functional blocks, such as a user interface, a radio frequency (RF) module, a camera, a sensor array, a display, a video player, a browser, etc., some or all of which may be utilized by operation in accordance with the concepts herein. The foregoing functional blocks may be operatively connected over one or more buses, such as bus 114. Bus 114 may comprises the logical and physical connections to allow the connected elements, modules, and components to communicate and interoperate.

Memory 112 of embodiments can be any type of volatile or non-volatile memory, and in an embodiment, can include flash memory. Memory 112 can be permanently installed in client device 110, or can be a removable memory element, such as a removable memory card. Although shown as a single element, memory 112 may comprise multiple discrete memories and/or memory types.

Memory 112 may store or otherwise include various computer readable code segments, such as may form applications, operating systems, files, electronic documents, content, etc. For example, memory 112 of the illustrated embodiments comprises computer readable code segments defining TA 120, transport accelerator (TA) control 125, and UAs 129a and 129b, which when executed by a processor (e.g., processor 111) provide logic circuits operable as described herein. The code segments stored by memory 112 may provide applications in addition to the aforementioned TA 120, TA control 125, and UAs 129a and 129b. For example, memory 112 may store applications such as a browser, useful in accessing content from server 130 according to embodiments herein. Such a browser can be a web browser, such as a hypertext transfer protocol (HTTP) web browser for accessing and viewing web content and for communicating via HTTP with server 130 over connections 151 and 152, via network 150, if server 130 is a web server. As an example, an HTTP request can be sent from the browser in client device 110, over connections 151 and 152, via network 150, to server 130. A HTTP response can be sent from server 130, over connections 152 and 151, via network 150, to the browser in client device 110.

UAs 129a and 129b are operable to request and/or receive content from a server, such as server 130. Either of both of UAs 129a and 129b may, for example, comprise a client application or process, such as a browser, a DASH client, a HTTP Live Streaming (HLS) client, etc., that requests data, such as multimedia data, and receives the requested data for further processing and possibly for display on a display of client device 110. For example, client device 110 may execute code comprising either of UAs 129a or 129b for playing back media, such as a standalone media playback application or a browser-based media player configured to run in an Internet browser. In operation according to embodiments, UAs 129a and 129b decide which fragments or sequences of fragments of a content file to request for transfer at various points in time during a streaming content session. For example, a DASH client configuration of a UA may operate to decide which fragment to request from which representation of the content (e.g., high resolution representation, medium resolution representation, low resolution representation, etc.) at each point in time, such as based on recent download conditions. Likewise, a web browser configuration of a UA may operate to make requests for web pages, or portions thereof, etc. Typically, the UA requests such fragments using HTTP requests.

It should be appreciated that, although two instances of UAs are shown with respect to the embodiment of client device 110 illustrated in FIG. 1, client devices of system 100 may comprise any number of UAs. For example, a particular client device configuration may comprise a single UA, whereas another client device configuration may comprise a plurality of UAs (i.e., two or more).

TA 120 is adapted according to the concepts herein to provide enhanced delivery of fragments or sequences of fragments of desired content (e.g., the aforementioned content fragments as may be used in providing video streaming, file download, web-based applications, general web pages, etc.). For example, TA 120 may operate to subdivide requests for content made by UAs 129*a* and 129*b* into a plurality of chunk requests for controlledly requesting chunks of the content from server 130 in order to provide accelerated delivery of the content to client device 110. TA 120 of embodiments is adapted to allow a generic or legacy UA (i.e., a UA which has not been predesigned to interact with the TA) that only supports a standard interface, such as a HTTP 1.1 interface implementing standardized TCP transmission protocols, for making fragment requests to nevertheless benefit from using the TA executing those requests. Additionally or alternatively, TA 120 of embodiments provides an enhanced interface to facilitate providing further benefits to UAs that are designed to take advantage of the functionality of the enhanced interface. TA 120 of embodiments is adapted to execute fragment requests in accordance with existing content transfer protocols, such as using TCP over a HTTP interface implementing standardized TCP transmission protocols, thereby allowing a generic or legacy content server (i.e., a content server which has not been predesigned to interact with the TA) to serve the requests while providing enhanced delivery of fragments to the UA and client device.

In providing the foregoing enhanced fragment delivery functionality, TA 120 of the embodiments herein comprises architectural components and protocols as described herein. For example, TA 120 of the embodiment illustrated in FIG. 1 comprises Request Manager (RM) 121 and one or more Connection Managers (CM) 122 which cooperate to provide various enhanced fragment delivery functionality. RM 121 may operate to receive and respond to fragment requests from UAs 129*a* and 129*b*, to subdivide requested fragments to provide a plurality of corresponding smaller data requests (referred to herein as "chunk requests" wherein the requested data comprises a "chunk"), and to direct chunk requests to CM 122. CM 122 may thus interface with RM 121 to receive chunk requests, send requests (e.g., HTTP requests) corresponding to those chunk requests over network 150, receive the responses to their chunk requests, and pass the responses back to RM 121, wherein the fragments requested by the UAs are resolved from the received chunks by RM 121 and provided to the requesting UA. Functionality of CM 122 of embodiments operates to decide when to request data of the chunk requests made by RM 121.

It should be appreciated that client device 110 of the illustrated embodiment is shown implementing a multiple interface architecture, such as may be utilized to provide simultaneous multi-port communication support for one or more communication sessions, communication port recovery with respect to communication sessions, etc. In particular, TA 120 is shown as including CMs 122*a*-122*d*. Correspondingly, I/O element 113 is shown as including a plurality of interfaces operable to facilitate data communication, shown as interfaces 161*a*-161*d*. RM 121 may likewise be adapted for operation with a plurality of different CM configurations and or to interface concurrently with more than one CM, such as to request data chunks of the same fragment or sequence of fragments from two or more CMs of CMs 122*a*-122*d*. Each such CM may, for example, support a different network interface (e.g., a first CM may have a local interface to an on-device cache, a second CM may use HTTP/TCP connections to a 3G network interface, a third CM may use HTTP/TCP connections to a 4G/LTE network interface, a fourth CM may use HTTP/TCP connections to a WiFi network interface, etc.). Correspondingly, the interfaces of I/O element 113 may comprise various configurations operable in accordance with a number of communication protocols. For example, interfaces 161*a*-161*d* may provide an interface to a 3G network, 4G/LTE network, a different 4G/LTE network, and WiFi communications, respectively, where TA 120 uses, for example, a transport protocol such as HTTP/TCP, HTTP/xTCP, or a protocol built using User Datagram Protocol (UDP) to transfer data over these interfaces. Each such interface may be operable to provide one or more communication ports for implementing communication sessions, such as via an associated communication link, such as connections 151*a*-151*d* shown linking the interfaces of I/O element 113 with components of network 150.

It should be appreciated that the number and configuration of interfaces utilized according to embodiments herein are not limited to that shown. Fewer or more interfaces may be utilized according to embodiments of a transport accelerator, for example. Moreover, one or more such interfaces may provide data communication other than through the network links shown (e.g., connections 151*a*-151*d*) and/or with devices other than network components (e.g., server 130).

In addition to the aforementioned code segments forming applications, operating systems, files, electronic documents, content, etc., memory 112 may include or otherwise provide various registers, buffers, and storage cells used by functional block of client device 110. For example, memory 112 may comprise a play-out buffer, such as may provide a first-in/first-out (FIFO) memory for spooling data of fragments for streaming from server 130 and playback by client device 110.

Processor 111 of embodiments can be any general purpose or special purpose processor capable of executing instructions to control the operation and functionality of client device 110. Although shown as a single element, processor 111 may comprise multiple processors, or a distributed processing architecture.

I/O element 113 can include and/or be coupled to various input/output components. For example, I/O element 113 may include and/or be coupled to a display, a speaker, a microphone, a keypad, a pointing device, a touch-sensitive screen, user interface control elements, and any other devices or systems that allow a user to provide input commands and receive outputs from client device 110. Any or all such components may be utilized to provide a user interface of client device 110. Additionally or alternatively, I/O element 113 may include and/or be coupled to a disk controller, a network interface card (NIC), a radio frequency (RF) transceiver, and any other devices or systems that facilitate input and/or output functionality of client device 110.

In operation to access and play streaming content, client device 110 may communicate with server 130 via network 150, using connections 151 and 152, to obtain content data (e.g., as the aforementioned fragments) which, when rendered, provide playback of the content. Accordingly, either or both of UAs 129*a* and 129*b* may comprise a content player application executed by processor 111 to establish a content playback environment in client device 110. When initiating playback of a particular content file, the UA may communicate with a content delivery platform of server 130 to obtain a content identifier (e.g., one or more lists, manifests, configuration files, or other identifiers that identify media segments or fragments, and their timing boundaries, of the desired content). The information regarding the media segments and their timing is used by streaming content logic of the UA of embodiments to control requesting fragments for playback of the content.

It should be appreciated that the number and configuration of interfaces utilized according to embodiments herein are not limited to that shown in FIG. 1. Fewer or more interfaces may be utilized according to embodiments of a transport accelerator, for example. Moreover, one or more such interfaces may provide data communication other than through the network links shown (e.g., connections 151 and 152) and/or with devices other than network components (e.g., server 130).

Server 130 comprises one or more systems operable to serve desired content to client devices. For example, server 130 may comprise a standard HTTP web server operable to stream content to various client devices via network 150. Server 130 may include a content delivery platform comprising any system or methodology that can deliver content to client device 110. The content may be stored in one or more databases in communication with server 130, such as database 140 of the illustrated embodiment. Database 140 may be stored on server 130 or may be stored on one or more servers communicatively coupled to server 130. Content of database 140 may comprise various forms of data, such as video, audio, streaming text, and any other content that can be transferred to client device 110 over a period of time by server 130, such as live webcast content and stored media content.

Database 140 may comprise a plurality of different source or content files and/or a plurality of different representations of any particular content (e.g., high resolution representation, medium resolution representation, low resolution representation, etc.). For example, content file 141 may comprise a high resolution representation, and thus high bit rate representation when transferred, of a particular multimedia compilation while content file 142 may comprise a low resolution representation, and thus low bit rate representation when transferred, of that same particular multimedia compilation. Additionally or alternatively, the different representations of any particular content may comprise a Forward Error Correction (FEC) representation (e.g., a representation including redundant encoding of content data), such as may be provided by content file 143. A Uniform Resource Locator (URL), Uniform Resource Identifier (URI), and/or Uniform Resource Name (URN) is associated with all of these content files according to embodiments herein, and thus such URLs, URIs, and/or URNs may be utilized, perhaps with other information such as byte ranges, for identifying and accessing requested data.

Network 150 can be a wireless network, a wired network, a wide area network (WAN), a local area network (LAN), or any other network suitable for the transfer of content as described herein. Network 150 may, for example, comprise a 3G network, 4G/LTE network, a WiFi network, etc., as well as combinations thereof. Moreover, although illustrated as a single network cloud, it should be appreciated that network 150 as utilized according to embodiments may comprise different or separate networks, any or all of which may comprise the same or different network technologies, providing communication between client device 110 and server 130. In an embodiment, network 150 can comprise at least portions of the Internet. Client device 110 can be connected to network 150 over a bi-directional connection, such as is represented by network connection(s) 151. Alternatively, client device 110 can be connected via a uni-directional connection, such as that provided by an Multimedia Broadcast Multimedia System (MBMS) enabled network (e.g., connections 151, 152 and network 150 may comprise a MBMS network, and server 130 may comprise a Broadcast Multicast Service Center (BS-MC) server). The connection can be a wired connection or can be a wireless connection. In an embodiment, connection(s) 151 can comprise a wireless connection, such as a cellular 3G connection (e.g., connection 151a provided by interface 161a), a cellular 4G connection (e.g., connections 151b and 151c provided by interfaces 161b and 161c, respectively), a wireless fidelity (WiFi) connection (such as connection 151d provided by interface 161d), a Bluetooth connection, or another wireless connection. Server 130 can be connected to network 150 over a bi-directional connection, such as represented by connection 152. Server 130 can be connected to network 150 over a uni-directional connection (e.g., a MBMS network using protocols and services as described in 3GPP TS.26.346 or an ATSC 3.0 network). The connection can be a wired connection or can be a wireless connection.

Client device 110 of the embodiment illustrated in FIG. 1 comprises TA 120 operable to provide enhanced delivery of fragments or sequences of fragments of desired content requested by UAs, such as either or both of UAs 129a and 129b. For example, as discussed above, TA 120 of the illustrated embodiments comprises RM and CM functionality which cooperates to provide various enhanced fragment delivery functionality operable to facilitate expedited delivery of data to the UAs of client device 110. However, transport acceleration functionality as traditionally provided may not be available to all configurations of UAs or in all situations. Accordingly, embodiments herein are adapted to facilitate requesting of transport accelerator operation by various UAs. For example, where a UA provides signaling to the TA that transport acceleration is desired with respect to particular content or a particular content request, the TA may detect the signaling and provide transport acceleration functionality in response thereto. However, as not all content requests may benefit from transport accelerator operation, embodiments nevertheless selectively implement transport accelerator operation (e.g. whereby one or more functions of transport accelerator operation is selectively bypassed or not based upon particular criteria) in response to such requests by various UAs. For example, although detecting signaling from a UA requesting that transport acceleration is desired with respect to particular content or a particular content request, the TA may operate to determine if implementation of transport acceleration functionality is to actually be implemented in response to the signaled request.

To aid in understanding the concepts herein, UAs 129a and 129b comprise UAs having different configurations as may be served, or not, by TA 120 adapted according to embodiments. As will be appreciated from the discussion which follows, UA 129 comprises an application or other user agent which, although not utilizing the resources or functionality of system framework 127, is nevertheless adapted to utilize the functionality of TA 120. In contrast, UA 129b comprises an application or other user agent which utilizes the functionality of system framework 127 and, through that interaction, may also be provided the functionality of TA 120.

In particular, UA 129b is adapted to communicate requests for content via system framework 127, wherein system framework 127 provides certain low level functionality for use by various UAs, such as UA 129b through link 128c. For example, system framework 127 may comprise the STAGEFRIGHT media player architecture provided by the ANDROID mobile device operating system which provides documented functionality (e.g., HTTP layer transactions, network layer transactions, media playback engine, etc.) to UAs via a published API. Accordingly, TA 120 of embodiments may be adapted to interoperate with system framework 127 and provide transport acceleration functionality for use by applications implementing the system framework 127 API. For example, system framework 127 may interact with TA 120, via link 128*d*, to provide content requests made by UA 129*b* to TA 120 for transport acceleration operation. TA 120 may, for example, provide an "always accelerate" port in association with link 128*d* whereby the content requests received via link 128*d* are known to be provided through system framework 127 and thus be subject to transport acceleration operation according to concepts described herein.

UA 129*a* may, however, be adapted to implement its own low level functionality or services (e.g., HTTP layer transactions, network transactions, media playback, etc.) that are otherwise available through system framework 127, such as to optimize those functions for operation of UA 129*a*. For example, UA 129*a* may comprise a relatively high network impact application (e.g., the NETFLIX or YOUTUBE client) which, rather than utilizing system framework 127, implements its own HTTP layer, network layer, media playback engine, and/or the like. Accordingly, UA 129*a* may operate to directly interact with one or more ports provided by I/O element 113, via link 128*a*, to communicate with server 130, thereby bypassing the transport accelerator functionality offered by TA 120.

Although UA 129*a* may be adapted to itself provide certain functionality which is also available through system framework 127, UA 129*a* may nevertheless benefit from the availability and implementation of other functionality, such as the transport acceleration functionality of TA 120. For example, the implementation of transport acceleration functionality may be complex, outside of the field of expertise of the developers of the UA, or otherwise not present an ideal opportunity for inclusion within UA 129*a* directly. Accordingly, it may be desirable for UA 129*a* to be provided access to the transport acceleration functionality of TA 120 of embodiments herein, despite the fact that UA 129*a* may not avail itself of the functionality of system framework 127.

UA 129*a* of the embodiment illustrated in FIG. 1 is adapted to facilitate operation in which transport accelerator functionality of TA 120 is implemented with respect to content requests made by the UA. For example, UA 129*a* may be adapted to interact with TA 120, via link 128*b*, to provide content requests made by UA 129*a* to TA 120 for transport acceleration operation. UA 129*a* of embodiments is adapted to selectively implement transport acceleration, such as by directing content requests directly to a port of I/O element 113, thereby bypassing the transport acceleration functionality of TA 120, or by directing content requests to a port of TA 120 to invoke the transport acceleration functionality of TA 120. TA 120 may, for example, provide a "selectively accelerate" port in association with link 128*b* whereby UA 129*a* may direct requests that are desired to be provided transport acceleration functionality to the selectively accelerate port of TA 120 via link 128*b*. The content requests received via link 128*b* are thereby subject to transport acceleration operation according to concepts described herein. It should be appreciated that modification of a UA to enable its use of transport acceleration functionality according to the concepts herein may be relatively minor. For example, the UA may be provided with logic to determine whether or not transport acceleration is desired with respect to particular operations, content, etc. and/or with logic to direct the appropriate requests to a transport accelerator port (e.g., the selectively accelerate port of embodiments of TA 120) for providing transport acceleration services with respect to requests made by the UA.

From the foregoing, in operation according to embodiments, UA 129*a* is adapted to direct content requests for which transport acceleration functionality is desired to a port associated with TA 120 (e.g., via link 128*b*). For example, logic of UA 129*a* may determine that the content requested comprises a large file, a particular type of media, streaming media content, etc., for which transport acceleration operation is desired (e.g., known or expected to provide download performance improvement). Accordingly, UA 129*a* may operate to selectively direct the content requests associated therewith to TA 120 via link 128*b*. Other content requests, such as content requests for relatively small files, particular types of media for which transport acceleration is impractical or generally does not result in improved performance, etc., may be directed to a port of I/O element 113 via link 128*a*, thereby bypassing TA 120, according to embodiments.

To facilitate transport acceleration operation according to embodiments herein, content requests made to a selectively accelerate port of TA 120 include signaling to indicate that it is desired that the request receive transport acceleration operation, to provide information useful in facilitating transport acceleration operation, and/or the like. For example, UA 129*a* of embodiments may operate to include header information with the content request (e.g., a HTTP header unique to transport accelerator operation herein) which indicates a request that the content request be provided transport accelerator functionality. Such header information may additionally include data, such as priority information, timing information, scheduling information, bitrate information, file size information, etc., useful in providing delivery of content to the UA in a desired or optimum manner.

In operation according to embodiments, the default behavior with respect to content requests received at a selectively accelerate port of TA 120 is not to provide transport acceleration functionality, but instead pass those requests on without acceleration processing (e.g., provide the content requests to a port of I/O element 113). Such default behavior facilitates a UA, that does not want to utilize system framework 127 and that also does not want a particular request accelerated, sending a request to a selectively accelerate port of TA 120 without the special header and thus bypassing transport acceleration operation for that request. If, for example, a special header indicating that the content request is to be accelerated is not present in the content request sent by UA 129*a* to TA 120, then the content request will not be accelerated by TA 120 of embodiments. Accordingly, a UA can use signaling, such as may be provided using the aforementioned special header, to indicate that the content request is to be provided transport accelerator functionality, as well as to provide additional meta-information that the transport accelerator can utilize in splitting up the request and scheduling it. This signaling (e.g., the special header) may be removed from the content requests by the transport accelerator of embodiments before forwarding the content requests to the content server. This signaling may be included in a content request in any of a variety of suitable manners, for example, the signaling may be a special header of an HTTP request, may be included as a field value of a header of an HTTP request, may be included in one or more parameters in a query string of a URI or URL of an HTTP request, and/or may be included as any other suitable feature of a content request.

The aforementioned signaling may be bidirectional, such as to include signaling from TA 120 to UA 129*a* regarding implementation of the requested transport accelerator functionality. For example, TA 120 of embodiments may operate to include a header (e.g., a HTTP header unique to transport accelerator operation herein) in one or more responses to UA 129a indicating whether a content request has been accelerated or not, providing information regarding the particulars of the acceleration provided (e.g., to facilitate compatible or optimized operation by the UA), etc.

In implementing the aforementioned transport accelerator signaling, embodiments herein may be adapted to provide a UA/TA special request header (referred to herein as a "QC-STA header") to carry information as described herein. Because the QC-STA header of embodiments is only relevant to the UA-TA connection, the QC-STA header may be removed before forwarding of the content request by the transport accelerator according to embodiments herein. Of course, the QC-STA header or other signaling may be configured such that it can be ignored and thus its removal may be optional. An example of a HTTP request header having QC-STA header of embodiments herein included therein is "Connection: close, QC-STA". A QC-STA header in accordance with the concepts herein may comprise a list of key-value pairs with separators (e.g., the separator ";" commonly used in HTTP headers). Each key-value pair may, for example, be provided in the format "key=value". The general form of a QC-STA header of embodiments may comprise "QC-STA: key1=value1; key2=value2; . . . ; keyN=valueN;", wherein the header token string itself ends with the separator ";". In operation according to embodiments, if a QC-STA header is not present in the content request, the content request will not be accelerated by the transport accelerator.

The keys included in a QC-STA header may provide various different types of information. For example, the keys utilized with respect to a QC-STA header may include, without limitation, fileType, priority, streamingBitRate, streamingPlaybackBuffer, and requestExpirationTime. Particular ones of the keys may include additional data or have additional data associated therewith. For example, approxFileSize information may be provided for all fileTypes, according to embodiments. It should be appreciated, however, that none of the keys are required to be present in the QC-STA header of embodiments. That is, the UA may send a content request with a QC-STA header that has no tokens therein, such as to initiate transport acceleration functionality using default parameters/settings. However, for content requests to a selectively accelerate port of TA 120 of embodiments herein, all the foregoing keys may be used as desired or as appropriate.

Table 1 below provides examples of the keys, the types of the values, and the possible values of the keys, as may be utilized with respect to a QC-STA header of embodiments herein.

TABLE 1

| Key | Meaning | Values and types of key |
| --- | --- | --- |
| fileType | Type of file | "streaming", "bulkFile"(string) |
| requestPriority | Priority of the request | unsigned int, the maximum value may be implementation dependent. Higher values mean higher priorities. Examples uses: |

TABLE 1-continued

| Key | Meaning | Values and types of key |
| --- | --- | --- |
| | | 0 - Background traffic (e.g., download manager) 1 - Regular foreground traffic (e.g., streaming video) 2 - Highest priority foreground traffic (e.g., MPD fetch) |
| streamingBitRate | Bit rate of the stream (e.g., in kbps) | unsigned int |
| streamingPlaybackBuffer | The UA can specify how long is the current playback buffer (e.g., in milliseconds) | unsigned int |
| requestExpirationTime | This time may specify the absolute time by which the response must be received by the UA | (floating point) This may be the system time (e.g., in seconds) since the Unix epoch. It should be parsed as a number with at least 64 bit precision according to embodiments. |
| approxFileSize | The approximate file size (e.g., in kilobytes (KB)). For streaming fileType, the UA may calculate this from duration of the segment and nominal bitrate | unsigned int |
| preferredNetworkInterface | The UA can indicate the network interface on which it prefers that the TA sends out the request. | string Example values: "WiFi". "Cellular 4G". |
| fastStartSize | If the UA desires a fast start-up, it can provide this parameter (e.g., in KB). | unsigned int |
| useHTTPS | Indicates whether the request/sub-requests are to be sent using SSL/TLS connection to server. | "y", "n" (string) |

By way of further explanation of the aforementioned keys as may be utilized according to embodiments of a QC-STA header herein, the "fileType" key may comprise information regarding the particular type of file the content request pertains to. This information may be used by the transport accelerator to determine if implementation of transport accelerator functionality is practical or advantageous for use in association with the content request, for example. Additionally or alternatively, such information may be utilized by the transport accelerator in determining how one or more aspects of the acceleration is to be implemented (e.g., determining chunk size, bit rate, error correction, etc.).

The "requestPriority" key may provide information regarding the priority of the given content request within the UA. In operation according to embodiments, there is a consistent mapping of the priority to the underlying or lower level communication layer. For example, embodiments may operate to pass this priority information to a low-level network library (e.g., CHROMIUM), such as to establish chunk request priorities which are consistent with the content request made by the UA. Additionally or alternatively, embodiments may implement a scheduling algorithm within the transport accelerator which schedules the chunk requests of a content request according to the priority information provided with the content request.

The "streamingBitRate" key may provide information indicating the rate at which the client is expected to play out or process the requested data. Accordingly, specifying the streaming rate according to embodiments can facilitate the transport accelerator operating to allocate an appropriate share of bandwidth to competing request streams which results in delivery of data to the UA meeting the indicated play out or data processing rate.

The "streamingPlaybackBuffer" key may indicate a length of the UA's current playback buffer. A streamingPlaybackBuffer key of embodiments may be utilized by the transport accelerator in determining how one or more aspects of the acceleration is to be implemented (e.g., determining chunk size, bit rate, error correction, etc.). For example, the size of the playback buffer can be used by TA 120 to determine the amount of data (e.g., the size and number of chunk requests to issue) to be downloaded in the near future.

The "requestExpirationTime" key may indicate the time by which the content request is to be completed. The target time may, for example, be given in seconds since the Unix epoch, with fractional seconds, may be allowed. In operation according to embodiments, the timestamp may be relative to the system time of the device in question, wherein the system time need not be correct for this implementation to allow accurate expiration times (e.g., where TA 120 and UA 129a use the same clock, the actual expiration will occur at the desired point in time). Upon reaching the expiration time, the transport accelerator of embodiments may operate to cancel the content request (e.g., any content data received thereafter may be unusable or undesirable as being untimely).

The "approxFileSize" key may indicate the approximate file size of the resource being requested. Such information may, for example, be used by the transport accelerator to choose an appropriate number of chunk requests to issue (e.g., before the exact file size is known). As an example of the utilization of approximate file size information according to embodiments, if the chunk size is C, RM 121 of TA 120 may issue max(floor(approxFileSize/C), 1) chunk requests before receiving the first response to actually determine the file size and issue further requests.

The "preferredNetworkInterface" key may indicate a preference that the request be transmitted on a specific network interface (e.g., WiFi). For example, the use of a WiFi network interface, when available, may be preferred over a cellular interface due to cellular data plan restrictions. Such a selection of preferred network interface may be facilitated, for example, through access by the UA to a connectivity manager that is aware of interfaces that are operational.

The "fastStartSize" key may be used by the UA to indicate a desire that a fast start-up to the delivery of the requested content be provided. In response, the transport accelerator may use its best efforts to meet the request, such as to use multiple interfaces to download this initial amount of content, and later switch to normal fetching operation, such as to switch from the use of multiple interfaces to the use of one interface, to fetch the remainder of the requested content.

The "useHTTPS" key may be used by the UA to indicate that the transport accelerator is to transmit the content request using a secure communication path (e.g., as provided by the HTTPS protocol).

Using the foregoing examples of the keys, the types of the values, and the possible values of the keys, an example QC-STA header with keys and their values may appear as:

QC-STA: fileType="streaming"; priority=1; streamingBitRate=7500; streamingPlaybackBuffer=10000; approxFileSize=300000; preferredNetworkInterface="WiFi"; fastStartSize=1000;

It should be appreciated that the foregoing provides examples of signaling as may be implemented according to embodiments herein and thus particular implementations may implement signaling to provide various different information in accordance with the concepts herein.

As a further example of the signaling as may be utilized according to embodiments, the keys, the types of the values, and the possible values of the keys, set forth in Table 2 below as may be utilized with respect to a QC-STA header in accordance with the concepts herein.

TABLE 2

| Key | Meaning | Values and types of key |
|---|---|---|
| fileType | Type of file | "streaming", "bulkFile"(string) |
| uniqueUAinstanceID | A unique ID of the UA instance issuing the request | (string) This may be a unique identifier string for the UA issuing the request (e.g., a string with the characters [a-zA-Z0-9\-+_]) |
| UAPriority | Priority of the UA | Unsigned int (e.g., the values may be in the range 0 to 7, wherein 0 - background priority, 3 - standard, and 7 - high priority, with the default being 3). |
| uniqueStreamID | A unique identifier of the stream to which the request belongs to. | (string) this may be a unique identifier string for the stream. |
| streamPriority | Priority of the stream | unsigned int (e.g., the values may be in the range 0 to 2^32 - 1, wherein higher values mean higher priorities). Examples uses: 0 - Background traffic (e.g., download manager) 2^31 - Regular foreground traffic (e.g., streaming video) 2^32-1 - Highest priority foreground traffic (e.g., MPD fetch) |
| streamBitRate | Bit rate of the stream (e.g., in kbps) | unsigned int |
| streamPlaybackBuffer | The UA can specify how long is the current playback buffer (e.g., in milliseconds) | unsigned int |
| requestExpirationTime | This time specifies the absolute time by which the response must be received by the UA | (floating point) This is the system time in seconds since the Unix epoch. It should be parsed as a floating point number with at least 64 bit precision (53 bit mantissa). |
| requestSoftExpirationTime | The time when the request expires "softly". See | Same as requestExpirationTime. |

TABLE 2-continued

| Key | Meaning | Values and types of key |
|---|---|---|
| | explanations below. | |
| requestUniqueID | A unique identifier handle for the request. | (string) This may be a unique identifier string for a request (e.g., comprising a free-form string with the characters [a-zA-Z0-9\-+_]) |
| requestPrerequisites | A comma-separated list of unique request identifiers which are prerequisites for the requested resource. | (string) (e.g., comma-separated list of unique request IDs, as defined in the requestUniqueID key). |

By way of further explanation of the aforementioned keys as may be utilized according to embodiments of a QC-STA header herein, the "uniqueUAinstanceID" key may facilitate operation of a UA making requests to the transport accelerator on several connections. For example, the uniqueUAinstanceID key may provide a priori information so that the transport accelerator can know which connections belong to which UA. Such information may be utilized by TA 120 of embodiments to give the transport accelerator the ability to be fair among UAs.

The "uniqueUAinstanceID" key of embodiments is selected in a way so it is unique. For example, the UA may create a 128 bit random number and use the hex notation of that random number as its unique ID. Alternatively, embodiments may define a convention for creating the unique ID which guarantees its uniqueness. For example, the unique ID may be a combination of the process PID and its start time, whereby such a combination is typically unique among all the processes on any given host.

The "UAPriority" key of embodiments is to establish a priority for the UA. The set of possible priority values implemented according to embodiments is kept at a deliberately low number (e.g., 8 distinct settings of the range of values from 0 to 7), such as to facilitate the consistent use of priority values across different UAs. Higher values for the priority key indicate higher priority according to some embodiments. In operation, requests of higher priority UAs may have preferential treatment, regardless of the priority values given to the individual streams. Priority values of the individual streams are compared on streams of the same UA, but not across UAs, in accordance with embodiments herein. For example, one UA may operate to keep all its content requests at the default value of $2^{31}$ while another (e.g., live streaming client) may have an elaborate scheme using potentially all the $2^{32}$ possible values over time, which should not result in one UA dominating the other because of the different way to assign the priorities in operation according to embodiments. However, in some embodiments, priority values of the individual streams may be compared on streams of across multiple UAs, for example, if the UAs have similar algorithms for assigning priority values and/or the UAs have been designed to work together.

Although it is expected that many UAs may not change their default priority (e.g., UAPriority=3), various streams may nevertheless utilize a different priority. For example, a non-interactive software update process might move out of the way of potentially running streaming clients by assigning itself a lower priority (e.g. UAPriority=0).

In operation according to embodiments, a UA may update a priority associated therewith by providing a new value in a new content request. One example of an application where a UA may operate to update its priority is a video streaming client with a very large buffer (e.g., GOOGLE PLAY operating to download a whole movie ahead of time). When the buffer is low, the UA may indicate a high priority, such as to increase the available buffered data, but down-prioritize itself once the buffer level reaches some threshold (e.g., several minutes of buffered data). The UA may again increase its priority should the buffer become low. It should be appreciated, however, that such priority updates introduce the risk of a race condition. In order to avoid a race condition, a UA of embodiments may update its priority after it has received at least a partial response to the previous content request where it updated its request priority.

The "uniqueStreamID" key may provide identification of the stream to which the content request belongs. Content requests with the same uniqueStreamID may be considered to belong to the same stream, and thus may share one or more properties among the keys according to embodiments. In operation according to embodiments, stream IDs need only be unique within the UA that makes the content requests (e.g., the transport accelerator may identify streams by both their ID and the UA ID associated therewith).

Having explicit stream identifiers according to embodiments facilitates use of several connections to the transport accelerator for a single stream by the UA, wherein the transport accelerator may still know what set of connections form that stream. Such a configuration may be useful in various situations. For example, where the UA comprises a DASH client, separate streams may be implemented for audio and video. If the UA uses a networking library (e.g., the CHROMIUM stack), the connections from the UA to the transport accelerator may not faithfully represent the streams (e.g., any content request on any connection may belong to either of the two streams). Accordingly, a DASH client operating in accordance with the concepts herein may tag its content requests with stream identifiers to thereby enable the transport accelerator to correctly prioritize chunk requests for the different streams.

The "streamPriority" key may provide a priority value for a stream (e.g., in the range 0 to $2^{32}-1$). A UA and transport accelerator may use algorithms similar to those described above, with respect to smaller sets of priority values, with a larger range of stream priorities. In operation according to embodiments, with respect to the streams of a same UA, the transport accelerator processes content requests from streams with higher priority before those with lower priority. A streamPriority value may remain in place for the stream for which the content request was made until it is updated in a subsequent content request. When the streamPriority value is updated, it may be considered changed for the whole stream, even for content requests of that stream that had been issued before the change of priority.

The "streamBitRate" key may indicate the bitrate (e.g., in Kbps) that should be assumed for the stream for which the content request is made. Such bitrate information may be used by a transport accelerator to implement a satisfactory bandwidth sharing policy, such as to facilitate desired performance at a UA without starving data delivery at another UA. In operation according to embodiments, the streamBitRate may remain set for a given stream until it is replaced with a new value in a subsequent content request for the same stream. A predetermined bitrate value (e.g., −1) can be used to clear the bitrate "hint" provided by the streamBitRate key of embodiments.

The "streamPlaybackBuffer" key may indicate an amount of playback buffer currently in the stream (e.g., in milliseconds). A streamPlaybackBuffer key of embodiments may be utilized by the transport accelerator in determining how one or more aspects of the acceleration is to be implemented (e.g., determining chunk size, bit rate, error correction, etc.). For example, when the streamPlaybackBuffer is large, the transport accelerator may request data in larger sized chunks to reduce uplink traffic and server load. With a small streamPlaybackBuffer, the transport accelerator may opt not to request data in larger sized chunks, since this increases the risk of head-of-line blocking in this case (e.g., a delayed chunk might cause the stream to be interrupted). Some transport accelerator implementations may treat a streamPlaybackBuffer value of X as roughly the same as the request having requestSoftExpirationTime set to X+T, where T is the time at which the request was received by the UA.

The "requestExpirationTime" key may provide a time by which the content request will have expired, and thus a time at which the UA is no longer interested in receiving any response to the content request. The transport accelerator of embodiments may, for example, close the connection to the UA when a content request expires and cannot be finished in time.

The "requestSoftExpirationTime" key may provide a soft expiration time by which the transport accelerator is to attempt to receive a response to the content request. In operation according to embodiments, if the requestSoftExpirationTime deadline is missed the transport accelerator may, for example, not cause the content request to be dropped. For example, the content may continue to be fetched by the transport accelerator, whereby everything is as if there were no expiration time associated with the content request, except that the transport accelerator may have implemented its best efforts to obtain the requested content prior to expiration of the requestSoftExpirationTime. In operation according to embodiments, the transport accelerator may utilize such a soft expiration time to decide on an appropriate request strategy. For example, if a transport accelerator can request FEC repair data, the transport accelerator may operate to request a sizeable amount of FEC data for content requests which are soon to soft expire, since those content requests would otherwise be liable to miss the deadline if packet losses occur which delay individual chunk requests. However, for other content requests which soft expire far in the future, the transport accelerator may operate to request fewer or no FEC data for those content requests, since in those cases data retransmission may act sufficiently fast, thereby avoiding using bandwidth for unnecessary FEC overhead. The particular soft expiration time used according to embodiments may change with request prerequisites, as further discussed below.

The soft expiration time of a requestSoftExpirationTime key of embodiments may additionally or alternatively be used with respect to a variety of other algorithms: For example, the transport accelerator may cancel and reissue chunk requests that appear to be stuck. Accordingly, the transport accelerator may employ such canceling and reissuing of chunk requests aggressively when the soft expiration time of the concerned content request is soon, and it may be more lenient if the expiration time is far in the future.

The "requestUniqueID" key may provide unique identification of a content request. Such request IDs may, for example, be chosen to be unique within the UA in question (e.g., not across UAs), and not just within one UA stream. A unique ID may be provided according to embodiments for the UA to be able to refer to a specific content request it issued later, such as for use with respect to the requestPrerequisites key discussed below.

The "requestPrerequisites" key may provide a delimited list of request IDs that are a prerequisite for a particular content request. For example, a requestPrerequsites key may comprise a comma-separated list of request IDs that are a prerequisite for the content request being issued. In a video streaming application, for example, a request for a fragment B that does not start with an I-frame, and which is not independently decodable but only decodable with the preceding fragment A, may make that request for fragment A prerequisite for the request for fragment B, to thereby indicate to the transport accelerator that fragment A is needed before fragment B. Another example for the utilization of such request prerequisites is a scalable high efficiency video coding (SHEVC) video streaming application, where the request for the base layer could be a prerequisite for the request for the first enhancement layer, and so on.

It should be appreciated that prerequisite information may be utilized according to embodiments herein for a number of purposes. For example, as shown in the examples above the perquisite information may be utilized to communicate a preferred ordering of individual content requests within a stream. For example, a client may implement a HTTP like sequential handling of requests, which may be achieved by making each request dependent on its predecessor. The same may not be achievable using other information, such as stream priorities, since such other information may not pertain to individual content requests (e.g., stream priorities act on entire streams and not individual requests). A DASH client may, for example, want to have a stream of video requests. If the client uses a HTTP library that does not support HTTP pipelining, but the client itself issues requests which overlap in time, the transport accelerator may receive requests for different streams on different TCP connections. Request prerequisites provided according to embodiments herein may be utilized to inform the transport accelerator how to order those requests relative to one another, thereby avoiding the need to buffer and reorder a potentially unbounded amount of data in the client. An alternative technique for solving this problem may be to provide for a request priority in addition to stream priority and UA priority, whereby request dependencies would not be necessary for this application.

Another purpose for which the prerequisite information of embodiments may be utilized is to provide the transport accelerator with information on how to act if one or more hard or soft expiration times cannot be met. In operation according to embodiments, the behavior for hard expirations may be different than that for soft expirations.

If request A is a prerequisite of request B (either directly or indirectly), and request A is subject to a hard expiration, then expiration of the hard expiration time of request A expires the expiration time for request B as well, according to embodiments, even if request B had a later expiration time (or no expiration time at all). The foregoing relationship may be implemented because if the hard expiration time of request A is reached and request A is not available, then request A will never be available. Since request A is a prerequisite of request B that will never be available in this example, then even if request B is available at some future point it will not be useful.

An example where the foregoing situation may occur is with respect to a SHEVC live video player. The SHEVC decoder may receive the next video section, such as a base layer with a number of enhancement layers, at a prescribed time (e.g., each second it receives the next second of video data) to be played out 200 ms after that. Accordingly, the data given to the player is a base layer and a number of enhancement layers. There is a restriction however that each second at most has as many enhancement layers that can be used as were used in the previous time around that video data was sent to the decoder. This repeats until the next full refresh segment comes around, at which point again any number of layers can be given to the decoder (e.g., every 5th segment could be such a refresh). The streaming module may request the base layer B1, and an enhancement layer E1 to be played at second 1.2, and thus set the hard expiration time to 1. Then, later, the streaming module may request base layer B2 and enhancement layer E2, to be played at second 2.2, and thus set the hard expiration time of those to 2.0. The request dependencies may be used to convey to the transport accelerator that E2 is not useful without E1, and that the transport accelerator should not fetch E2 if E1 is not received in time. This may be accomplished according to embodiments herein by tagging E2 as dependent on E1 (it being appreciated that, at the time the request for E2 is issued, it may not be known whether E1 will succeed or not).

Such request dependencies are not only useful with respect to hard expirations, as shown in the foregoing examples, but are also useful in conjunction with soft expirations. As an example of the utility of request dependencies with respect to soft expirations, a UA may have issued two requests A and B, with request A having a soft expiration time before the soft expiration time of request B. Where request B depends on request A, if the transport accelerator fails to download request A by its soft expiration time, it may nevertheless still try to complete request A, together with request B (e.g., by the soft expiration time of request B, since only then will it have met the soft expiration deadline of request B). Stated more generally, the actual effective soft expiration time used for a request A within a transport accelerator of embodiments may be the minimum of the tagged soft expiration times of request A and its direct and indirect dependent requests (e.g., request B in the foregoing example).

To further illustrate the use of request dependencies with respect to soft expirations, a SHEVC video client is again considered. At time 1, the UA may play segment 1, either the base layer B1 only, or the combination of base and enhancement layers B1+E1. Thus, a request for B1 may be issued with soft expiration time 1, and another request for E1, also soft expiring at time 1, and B1 declared as a prerequisite of E1. At time 2, the UA may play segment 2, either the base layer B2 only, or the combination of base and enhancement layers B2+E2. Thus, a request for B2 may be issued with soft expiration time 2, and another request for E2, also soft expiration time 2, and B2 declared as having B1 as a prerequisite and E2 declared as having both B2 and E1 as a prerequisite (e.g., E2 in this example needs both B2 and E1 in order to be playable). Where B1 is received in time 1, but not E1, the player can play the base layer B1 at time 1 without the enhancement layer E1. The transport accelerator of embodiments may thus try to download all of E1, B2, and E2 by time 2, since all the effective soft expiration times are now 2. If the transport accelerator is successful in downloading all of E1, B2, and E2, the player may be able to play the combination of B2+E2 at time 2, since all the prerequisites to decode these layers correctly would be available.

A difference between the example of soft expiration times to the previous example of hard expiration times is that, in the hard expirations example, it is presumed that the decoder cannot "catch up" with playback time (e.g., the player can only make use of any layers that it receives in time). In the soft expiration example, on the other hand, it is presumed that a request that is received after its soft expiration time may nevertheless be used to decode a dependent request (e.g., E1 can be used to decode E2, as long as E1 and E2 are received shortly before the playout time of E2, even if E1 was not received in time for playout itself).

It should be appreciated that the exemplary signaling set forth in Table 2 above differs from that of Table 1 in several ways. One notable difference is that the concept of streams is expressly provided for in the signaling of Table 2. Many properties are relevant to streams, rather than individual requests, and thus may be set on a per stream basis. For example, the bitrate may be difficult to set accurately with respect to a single short request, although it may be easier and more meaningful to enforce with respect to a stream of requests.

In another difference provided for in the signaling of Table 2, content requests may expire "softly", whereby the expiration time does not invalidate the content request. Optional request dependency information has been added as another difference in the signaling of Table 2. Such dependency information may, for example, be useful for video streaming applications.

As compared to the exemplary signaling of Table 1, the following keys may be replaced or superseded by different keys in the signaling provided in the example of Table 2, according to embodiments: streamingBitrate (superceded by streamBitrate) and streamingPlaybackBuffer (superceded by streamPlaybackBuffer). The requestPriority key of the exemplary signaling of Table 1 may be replaced by, or used in addition to, the streamPriority key of the exemplary signaling of Table 2 of embodiments.

Although the foregoing signaling examples have been described with reference to signaling provided by a UA to a transport accelerator, the signaling implemented with respect to transport accelerator functionality of embodiments herein comprise signaling from the transport accelerator to the UA. For example, TA 120 of embodiments may include a special response header (referred to herein as a "QC-STA-response header") in one or more responses to UA 129*a* indicating various signaling according to the concepts herein. The form of a QC-STA-response header may be the same as that of the QC-STA header of a content request, as described above.

Table 3 below provides examples of the keys, the types of the values, and the possible values of the keys, as may be utilized with respect to a QC-STA-response header of embodiments herein.

TABLE 3

| Key | Meaning | Values and types of key |
| --- | --- | --- |
| requestAccelerated | Indicates whether request has been accelerated by the TA | "y", "n"(string) |
| requestEstimatedReceiveRate | Indicates the expected rate for large requests to the server for which the request was made (e.g., in Kbps). | (unsigned int) |
| numberOfSupportedPriorities | The number of distinct requestPriority values supported. | (unsigned int) |

TABLE 3-continued

| Key | Meaning | Values and types of key |
|---|---|---|
| usedHTTPS | Indicates whether the TA succeeded in sending sub-requests using SSL/TLS connection to server. | "y", "n" (string) |

By way of further explanation of the aforementioned keys as may be utilized according to embodiments of a QC-STA-response header herein, the "requestAccelerated" key may indicate whether or not the content request is being accelerated. Such information may be utilized by the UA to "learn" which requests may or may not result in acceleration, to adjust one or more attributes for proper or optimized operation with respect to the accelerated/non-accelerated delivery of requested data, etc.

The "requestEstimatedReceiveRate" key may indicate an estimate of the rate that can be achieved to the server to which the content request was made (e.g., when a sufficiently large amount of data is being requested). For example, an adaptive streaming client may make use of this information to decide on a good representation to choose for playback. In operation according to embodiments, a transport accelerator may compute an estimate of such a receive rate based on a history of rates it was able to achieve in the past on this server. Additionally or alternatively, the transport accelerator may use an estimate of the rate achievable over the network interface that is being used. Accordingly, such an estimate can be obtained according to embodiments with historical information about the achievable rate.

The "numberOfSupportedPriorities" key may be used to indicate the number of distinct priority values that the transport accelerator supports. Such information may be utilized by the UA in adjusting the priorities assigned to its content requests to fall within the range supported by the transport accelerator to thereby ensure proper relative priority treatment with respect to each such content request.

The "usedHTTPS" key may be used to indicate whether the transport accelerator was successful in establishing a secure link to the content server with respect to the content request. A UA may, for example, elect to transmit content requests to a port of I/O element 113 rather than to a selectively accelerate port of TA 120 where the transport accelerator reports that it has not been successful in establishing secure communications, such as to attempt establishing the secure communications directly through I/O element 113.

Having provided examples of the various signaling that may be provided between a UA and transport accelerator for providing enhanced delivery of fragments or sequences of fragments of desired content requested by UAs according to the concepts herein, further detail with respect to exemplary uses of such signaling in accordance with embodiments herein is described below. It should be appreciated, however, that the examples provided are not exhaustive of the utilization of such signaling in accordance with the concepts herein.

In utilizing bitrate information, such as provided by the foregoing streamingBitRate and/or streamBitRate keys, a scheduling algorithm of TA 120 may be adapted to schedule chunk requests to allow fairly sharing different bitrate streams (e.g., a 400 Kbps stream may receive approximately 4 times as many chunk requests as a 100 Kbps stream). Accordingly, such a scheduling algorithm may limit the bitrate of a given stream, thereby giving lower priority streams a chance to obtain some of the bandwidth.

The aforementioned expiration time information, such as provided by the requestExpirationTime and requestSoftExpirationTime keys, may be used by TA 120 of embodiments to schedule chunk requests in accordance with one or more of the following algorithms. A transport accelerator chunk request limiting algorithm may, for example, be used in a low latency live streaming situation. An underlying idea behind utilization of such an algorithm according to embodiments is that if a content request is known to expire at some time Te, it may be advantageous to cease issuing new chunk requests for that content request a short time before Te, since the responses to chunk requests too close to Te will not likely be returned by time Te. An effect of implementation of such an algorithm is that the transport accelerator may then move on to processing other content requests shortly before the expiration time, thereby leading to less wasted chunk requests for content requests that will expire.

Such a transport accelerator chunk request limiting algorithm may be expressed in accordance with the following:
Let T be the current time;
Let Te be the expiration time of the UA request under consideration;
Let Tstart be the average time from when a chunk request is issued until the start of the response is received (this is an estimate of the round trip time (RTT) including queuing delay);
Let Tend be an average time from chunk request issue time until the chunk response is complete (Tstart and Tend can be measured, such as with exponentially-weighted moving average (EWMA) estimators within RM 121);
Let cs and ce be configuration constants;
If T+cs*Tstart+ce*Tend>=Te, do not issue any further chunk requests for the given UA content request.

In the foregoing example, cs and ce may typically be chosen such that cs, ce>=0 and cs+ce=1. Some possible choices for cs and ce are set forth in Table 4 below.

TABLE 4

| cs | ce | Corresponding policy |
|---|---|---|
| 1 | 0 | Issue chunk requests as long as a partial chunk response is likely to come back by Te |
| 0 | 1 | Issue chunk requests as long as the full chunk response is likely to come back by Te |
| 0.5 | 0.5 | Issue chunk requests as long as about half the chunk response is likely to come back by Te |

In a variant on the foregoing transport accelerator chunk request limiting algorithm F(t) is the probability that at a chunk request will take t or less time to complete. Thus, F(0)=F(negative value)=0, F(infinity)=1, and F is monotonically increasing. Although F may typically not be known, a parametric or a nonparametric estimate of F can be made. This variant on the transport accelerator chunk request limiting algorithm may be expressed in accordance with the following:
Let T be the current time;
Let Te be the expiration time of the UA request under consideration;
Let pthresh be a configuration constant;
If F(Te−T)<pthresh, do not issue any further chunk requests for the given UA request.

The foregoing pthresh configuration constant may be chosen to be some suitable value between 0 and 1, and, depending on how F is estimated, the limit values 0 and 1 may also be sensible.

In operation, the transport accelerator chunk request limiting algorithms given in the examples above will continue to send chunk requests for a content request until the content request about to expire hard. When the channel rate is approximately known, a transport accelerator operable according to embodiments herein may conclude much earlier that a content request will not succeed before its hard expiration time, and therefore not waste bandwidth by requesting any (or further) chunk requests for it. Such transport accelerator embodiments may thus implement an algorithm for giving up request whose hard expiration deadline cannot be met. Such an algorithm based upon request hard expiration by be expressed with the following:

Let Te be the expiration time for the request under consideration;
Let S be the size of the request under consideration (if the size is not known, an estimate may be used);
Let V be the number of bytes already requested for the request under consideration;
Let ca be a configurable constant (e.g. ca=1);
Let R be an estimate of the download rate (for the content request under consideration);
Let Tstart be an estimate of the time from chunk request issue time until the response starts to come in (this may be the same as Tstart from the exemplary algorithm above);

Let $d := Te - (T + Tstart)$;

If ca*d*R<S-V, then do not issue chunk requests for the content request under consideration.

Some possible choices for ca are set forth in Table 5 below. Since giving up on a request is generally undesirable, choices of ca>=1 would by typically favorable.

TABLE 5

| ca | Corresponding policy |
|---|---|
| 1 | If the request can't be completed with the current download rate, don't issue more chunk requests. |
| 2 | If with twice the current rate the request can't be completed, don't issue more chunk requests. |
| 0.5 | If with half the current rate the request can't be completed, don't issue more chunk requests. |

The rate R may change over time. Nevertheless, if the algorithm above prevents chunk requests to be issued at a given point in time, it may not prevent it at a later time.

Embodiments may implement FEC algorithms in association with soft expiration times, such as those provided by the requestSoftExpirationTime key. For example, if FEC data for content requests is available, embodiments may operate to request FEC data more aggressively when a soft expiration time is soon. Such an algorithm may adjust to the underlying channel conditions (e.g., when the error probability is low, little overhead may be requested even if expiration is soon).

The number of distinct stream priorities that may be provided according to embodiments, such as through the streamPriority key, may be quite large (e.g., 2'12). Such a large number of priorities may be useful with respect to some applications, such as to allow each content request to be sent with a different priority. In order to not exhaust the set of available priority values in such a case, a large number of different priority values can be communicated to the transport accelerator. Also, if a transport accelerator were to use HTTP/2.0 as a backend, the client may be enabled to use the complete set of priorities as supported by HTTP/2.0. Accordingly, embodiments herein implement algorithms to provide priority mapping into smaller sets, to thereby accommodate the use of such large distinct priorities as well as to facilitate interoperability. For various technical reasons, some implementations of a transport accelerator may not internally support all the possible priority values (e.g., 2^32). In such a case, a priority mapping algorithm may be provided to map the values to a smaller set of internally supported priorities. Although there are many ways in which such priority mapping may be done, an exemplary embodiment is provided below. It should be appreciated that, although the following example may be seemingly complicated, it has advantages over other mapping techniques which may be implemented, as will be better understood from the discussion which follows.

Where the transport accelerator supports N distinct internal priorities from 0, . . . , N−1, the following algorithm provides mapping to an internal priority for a given 32 bit priority P:

```
s_small = floor(2^32 / N)
s_large = s_small + 1
n_large = 2^32 − N*S_small
n_small = N − n_large
    # NOTE: s_small*n_small + s_large * n_large = 2^32
If P >= n_small * s_small,
    internalPriority = n_small + floor((P − n_small*s_small) / s_large)
Else,
    internalPriority = floor(P / s_small)
```

Most clients do not need 2^32 distinct priorities, and thus may possibly utilize a much smaller set of only M distinct priorities. In that case, a client may have the possible request priorities 0, M−1. In order to compute a 2^32 bit precision priority P' for a given priority clientInternalPriority in the range 0, . . . , M−1, the following algorithm may be used:

```
s_small_c = floor(2^32 / M)
s_large_c = s_small_c + 1
n_large_c = 2^32 − M*S_small_c
n_small_c = M − n_large_c
    # NOTE: s_small_c*n_small_c + s_large_c *
n_large_c = 2^32
If clientInternalPriority >= n_small_c,
    P' = n_small_c * s_small_c + (clientInternalPriority −
n_small_c) * s_large_c
Else,
    P' = clientInternalPriority * s_small_c
```

The foregoing priority mapping techniques not only provide for interoperability, but also provide advantages over other possible priority mapping techniques. For example, the priority mapping of exemplary embodiments above may guarantee that as long as the transport accelerator supports at least as many distinct priorities as the application requires (i.e., as long as N>=M), the distinct client priorities map to distinct transport accelerator priorities with the priority ordering being correctly preserved. Note that this priority mapping works without the client knowing transport accelerator's internal value of N, nor the transport accelerator knowing the client's value of M. Moreover, if a client uses another way to assign priorities (e.g., by using the assignment P'=floor(clientInternalPriority*2^32/M)), priority mapping according to the exemplary embodiments will nevertheless work relatively well as long as the assignment chosen spreads the values into the 2^32 range.

As can be appreciated from the foregoing, signaling may be implemented between a UA and TA for requesting transport accelerator operation with respect to particular content, particular content requests, etc. In operation according to some embodiments, the TA may detect the presence of such signaling indicating a desire for transport acceleration functionality and thus provide the transport acceleration functionality. It should be appreciated, however, that, although signaling which may be used to facilitate transport acceleration operation with respect to content requests made to a TA according to embodiments herein, embodiments herein may nevertheless operate to selectively provide transport acceleration operation with respect to such content requests. That is, although detecting signaling from a UA requesting that transport acceleration is desired with respect to particular content or a particular content request, the TA of embodiments may operate to determine if implementation of transport acceleration functionality is to actually be implemented in response to the signaled request. For example, content request sent to a selectively accelerate port may be subject to a further set of rules by the transport accelerator in order to determine whether the content request will be accelerated or not.

A request dispatcher, such as may be implemented by logic of TA control 125, may operate to analyze a content request, or aspects thereof (e.g., to parse the request-URI, header fields, and other elements of a content request and/or response messages) in order to generate one or more rules used to determine when to accelerate or bypass acceleration of a content request. Such rules may, for example, provide checks for the presence of certain key word/phrase patterns. In operation according to embodiments, such rules are utilized to provide an exclude list, whereby the exclude list comprises a set of blacklist rules (e.g., involving a set of checks on the HTTP version, message method, requested file suffixes, headers, and the (server, resource) tuple, etc.) which, when met, cause a determination that the content request will not be accelerated.

In accordance with the foregoing, the embodiment illustrated in FIG. 1 includes TA control 125 adapted according to the concepts herein to provide selective transport accelerator operation with respect to communication sessions. As described above, TA control 125 may be implemented as computer readable code segments, such as may be stored in memory 112, which when executed by a processor (e.g., processor 111) provide logic circuits operable as described herein. TA control 125 may comprise one or more functional blocks, such as analysis/control logic 126 of the illustrated embodiment, operable to provide the requisite functionality for operation as described herein. It should be appreciated that, although shown as disposed within client device 110, embodiments may employ different configurations of TA control functionality. For example, some portion of TA control 125 may be disposed external to client device 110, such as analysis/control logic 126 disposed at server 130 and/or another processor-based system in communication with client device 110, while another portion is disposed at client device 110. Likewise, TA control 125, or portions thereof, may be disposed within client device 110 other than as shown in the illustrated embodiment. For example, TA control 125, or some portion thereof (e.g., analysis/control logic 126), may be disposed within TA 120 of embodiments.

TA control 125 of embodiments operates to distinguish between messages for which transport acceleration is to be provided and messages for which transport acceleration is not to be provided to thereby provide selective transport accelerator operation. For example, as discussed above, TA 120 may operate to subdivide fragment requests into chunk requests (e.g., breaking down HTTP requests into smaller requests to be sent to the server at the opportune times) for facilitating transport acceleration. However, the use of such smaller chunk requests may not provide desired operation in all situations. The operation of breaking the requests into smaller requests and serving those smaller requests has overhead associated therewith. In some cases, such as where the files storing the requested content are themselves small, the increased overhead may result in the transport of the data not having been accelerated. Similarly, where there are particular dependencies between the requests, such as where there are small files that are prerequisites for content expected to be downloaded later, operation to make the subdivided requests can split the requests with respect to this interdependent content such that critical time is lost in the dependency graph and the content is reassembled (e.g., a resultant web page is rendered) more slowly due to the attempted acceleration. As another example, the chunk requests may be made using byte range requests, whereas the server may not support byte range requests (e.g., ignoring the unsupported byte range information in the request and returning a complete file in response to each chunk request). Such situations may result in increased network congestion while failing to provide transport acceleration.

Accordingly, logic of TA control 125 may operate to analyze content requests made to the selectively accelerate port of TA 120 (e.g., those content requests for which a QC-STA header is included, thereby indicating that the UA wishes to have the content request accelerated). For example, analysis/control logic 126 may obtain one or more acceleration selection attributes from or in association with the content request and determine if transport acceleration is to be provided by TA 120 with respect to a particular message or communication session. Analysis/control logic 126 may thereafter provide signaling to TA 120 (and/or a routing block associated therewith), such as via TA control 125, to cause the requests for that message or communication session to either be provided transport acceleration operation or not to be provided transport acceleration operation by TA 120, based upon the foregoing determination. In either situation, TA 120 may operate to strip the remainder of transport acceleration signaling (e.g., the aforementioned QC-STA header) prior to passing the request, or portions thereof (e.g., chunks), on to server 130. Moreover, TA 120 may operate to provide signaling to UA 129*a* to indicate the status of the acceleration determination and/or to provide information with respect to the operation thereof.

Figure 2A:
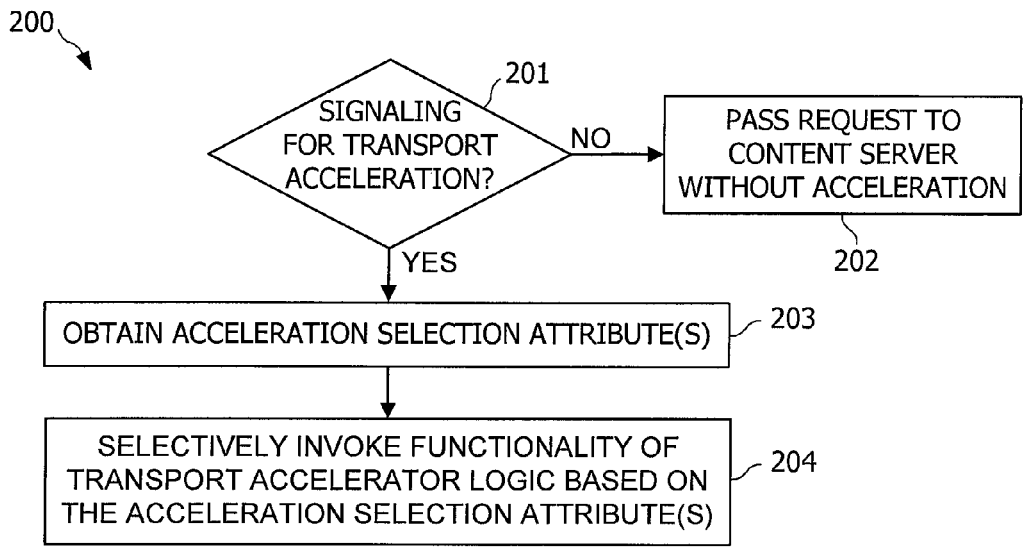
FIG. 2A shows a high level flow chart illustrating operation of transport accelerator control logic to provide transport accelerator operation according to embodiments of the present disclosure.

The flow chart of FIG. 2A shows flow 200 illustrating operation of TA control 125 to provide selective transport accelerator operation according to embodiments herein. At block 201 of the illustrated embodiment, a content request made to the selectively accelerate port of TA 120 is analyzed to determine if signaling is present which indicates that the request is to receive transport acceleration operation. For example, analysis/control logic 126 may operate to analyze header information included with the content request (e.g., a HTTP header unique to transport accelerator operation herein) which indicates that the content request is to be provided transport accelerator functionality. The signaling, which indicates that the request is to receive transport acceleration operation, may be included in the content request in any of a variety of suitable manners, for example, the signaling may be a special header of an HTTP request, may be included as a field value of a header of an HTTP request, may be included in one or more parameters in a query string of a URI or URL of an HTTP request, and/or may be included as any other suitable feature of a content request according to embodiments herein. If signaling is not present to indicate transport acceleration is desired with respect to the content request, processing according to the illustrated embodiment proceeds to block 202 wherein the request (although having been provided to the selectively accelerate port of TA 120) is passed on to server 130 without acceleration operation having been provided by TA 120.

If, however, signaling is present to indicate transport acceleration is desired with respect to the content request, such transport acceleration processing may or may not be provided according to embodiments. Thus, in this case, processing according to the illustrated embodiment proceeds to block 203 wherein one or more acceleration selection attributes are obtained by logic of TA control 125 for use in selectively implementing one or more functions of TA 120. For example, logic of TA control 125 may obtain one or more acceleration selection attributes from a request (e.g., fragment and/or chunk request) itself. The acceleration selection attributes may comprise an attribute of a user agent's request for content from a content server, an attribute of the content server, etc.

In obtaining one or more acceleration selection attributes from a request, logic of TA control 125 may operate to analyze various aspects of requests, communication protocols utilized with respect to requests, data within requests, etc. to identify information with respect to acceleration selection attributes. For example, TA control logic may operate to analyze such information as the URI, user agent fields, byte range or content length fields, etc. to identify information useful for identifying acceleration selection attributes. In operation according to embodiments, TA control logic may analyze the request to determine the protocol type of the request (e.g., HTTPS, HTTP1.0, HTTP2.0, etc.), properties of the communication session associated with the request (e.g., spdy_enabled, quic_enabled, upstream_proxy_configured, etc.), the type of request being made (e.g., HTTP GET, PUT, POST, TRACE, OPTIONS, etc.), header information within the request (e.g., byte range header with multiple ranges present, authorization header present, etc.), and/or the like. In operation according to embodiments, a user agent field may be populated with a special value, so as to identify accelerable traffic. Additionally or alternatively, the logic of TA control 125 may operate to analyze information provided in, or in association with, the aforementioned signaling. For example, information provided by one or more of the aforementioned keys provided in a QC-STA header, such as fileType, priority, streamingBitRate, streamingPlaybackBuffer, and requestExpirationTime, may be analyzed for acceleration selection according to embodiments herein.

Having obtained one or more acceleration selection attributes, operation according to flow 200 of the illustrated embodiment proceeds to block 204 wherein logic of TA control 125 controls selective invocation of functionality of TA 120 (e.g., selectively invoking transport acceleration operation) based on the one or more acceleration selection attributes obtained by the TA control logic. The selective invocation of functionality of TA 120 under control of the logic of TA control 125 may operate to cause logic of the transport accelerator to obtain the content from the content server using the aforementioned functionality or cause logic of the transport accelerator to obtain the content from the content server bypassing the aforementioned functionality. For example, TA 120 (particularly RM 121 thereof) may operate to provide subdividing the user agent's request for content into a plurality of chunk requests for requesting chunks of the content from the content server for providing accelerated delivery of the content to the client device. This request "chunking" functionality for transport acceleration may be selectively invoked (e.g., bypassed or not, such as by controlledly bypassing RM 121 and/or other logic of TA 120) under control of logic of TA control 125 based upon acceleration selection attributes.

Analysis of the acceleration selection attributes by TA control logic for determining whether functionality of the transport accelerator is to be invoked according to embodiments may employ some general rules and/or assumptions. For example, in operation according to embodiments herein one or more sets of exclude list rules are applied to content requests received in the selectively accelerate port of TA 120 in order to determine whether the content request should be accelerated or not. Embodiments may, for example, implement a plurality of sets of exclude list rules, such as may include a blacklisted server list (e.g., exclude list 126a) and request attribute exclude list (e.g., exclude list 126b).

A blacklisted server list utilized according to embodiments herein may comprise a list of servers for which it has been determined that, for one reason or another, request acceleration is not practical or possible. For example, UA 129a may provide a content request to a particular server which has already been determined not to be compatible with transport acceleration operation by TA 120, and thus included on the blacklisted server list of exclude list 126a. Thus, operation of analysis/control logic 126 at block 204 of flow 200 may determine that the request is not to be provided transport acceleration functionality. An example of a blacklisted sever list is provided in Table 6 below.

TABLE 6

| Server | Resource | Timer Value |
|---|---|---|
| Hostname | File_Extension | 1440 min (1 day) |

It should be appreciated that such a blacklisted server list may provide for blacklisting with respect to particular resources (e.g., as designated by the "Resource" column of Table 6). Accordingly, requests for other resources, although to an otherwise blacklisted server, may nevertheless not be denied transport acceleration functionality due to the server having been listed in the blacklisted server list with respect to a different resource. Other information, such as the "Timer Value" (explained below) of Table 6 may be included in a blacklisted server list according to embodiments, as appropriate or desired.

A request attribute exclude list utilized according to embodiments herein may comprise various attributes of, or associated with, a content request from which a determination may be made regarding implementation of transport acceleration for the content request. Table 7 below provides an example of a request attribute exclude list (e.g., exclude list 126b) as may be utilized according to embodiments herein. This exemplary table identifies particular protocol type of the request, properties of the communication session associated with the request, the type of request being made, and header information within the request, which if present in association with a request, the request is to be excluded from transport acceleration operation (e.g., transport acceleration functionality is to be bypassed).

TABLE 7

| Protocol Type | Session Properties | Type of Message | GET message header fields |
|---|---|---|---|
| HTTPS | spdy_enabled | Anything other than GET | Byte Range Header with multiple ranges present Authorization Header present |
| HTTP1.0 | quic_enabled | | |
| HTTP2.0 | upstream_proxy_configured | | |

The particular entries in an exclude list herein may be determined through a number of techniques. For example, entries may be made for certain resources (e.g., content files by suffix, path, or region, user agent by identifying information, content server by identifying information or path, etc.) known a priori to be incompatible or otherwise unsuited for transport acceleration operation. Additionally or alternatively, content transfer may be monitored (e.g., monitoring transport accelerator operation, network congestion, user agent operation, user experience metrics, etc.) to empirically determine compatibility or suitability for transport acceleration operation. Moreover, resources for entry in an exclude list may be learned over time, such as based on the responses to requests. For example, learning logic of TA control 125 may operate to populate either or both of the exclude list and/or the include list with information regarding particular content servers and/or other resources, such as based upon support/no support for byte range requests, requests resulting in forbidden or range not-satisfiable responses, etc. Embodiments of the learning logic of TA control 125 may operate to analyze response codes as provided by a content server, perhaps in combination with monitoring operation to serve the requests, to learn which response codes are indicative of the content server compatibility or suitability for transport acceleration operation.

Figure 2B:
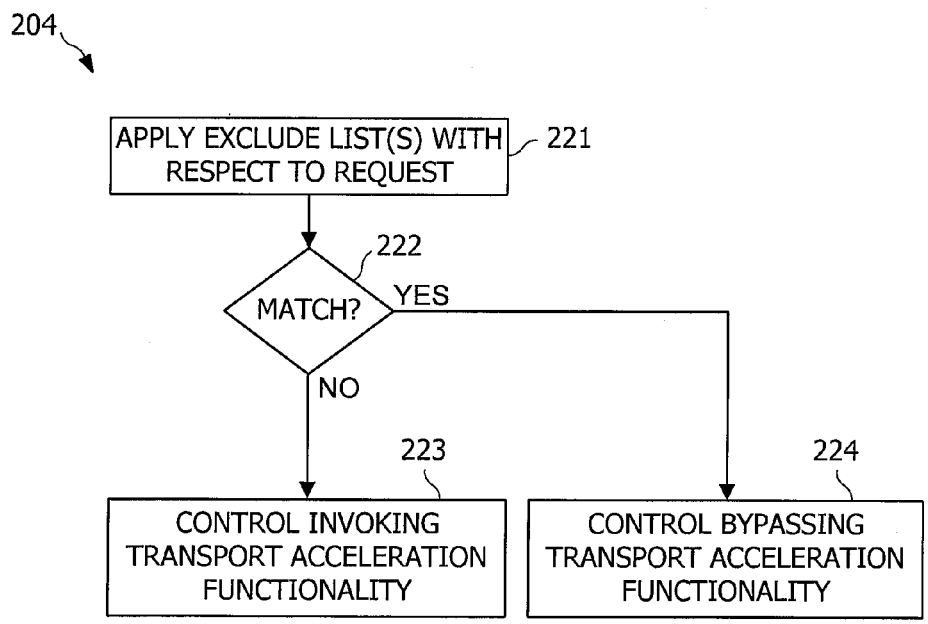
FIG. 2B shows a high level flow chart illustrating operation for selectively invoking functionality of transport accelerator logic according to embodiments of the present disclosure.

The flow chart of FIG. 2B illustrates operation of TA control 125 according to an embodiment of block 204 to provide selective invocation of functionality of transport accelerator logic based on one or more exclude lists (e.g., a blacklisted server list and a request attribute exclude list). At block 221 of the illustrated embodiment, the exclude list(s) (e.g., exclude list 126a and/or exclude list 126b) are applied with respect to the content request. In operation according to embodiments, a plurality of exclude lists may be applied hierarchally. For example, a server exclude list may be relatively easily implemented and require little processing power to determine if the content request is directed toward a blacklisted content server. Thus, such an exclude list may be applied higher in the hierarchy (e.g., before a request attribute exclude list which may require more processing power to implement). As another example of hierarchal implementation of exclude lists herein, an exclude list (e.g., as may comprise the exclude list of Table 7 shown above) may be applied on a column by column basis (e.g., from left to right) to implement the exclude rules hierarchally, such as for ease of operation. For example, string searches are generally slower and/or utilize more computing resources than attribute matches, thus attribute searches such as "spdy_enabled" may be performed before any string matching to provide improved performance and/or reduce resource utilization where a match is found early in the application of the exclude rules according to embodiments. At block 222 a determination is made as to whether any of the exclude rules are met (e.g., a content server to which the request is directed or an acceleration selection attribute matches an entry in the exclude list).

If any one of the exclude conditions is satisfied processing according to the illustrated embodiment proceeds to block 224 wherein transport acceleration functionality is bypassed. For example, logic of TA control 125 may operate to control a routing block of TA 120 to cause the request to bypass transport acceleration functionality, preferably stripping any signaling (e.g., the aforementioned QC-STA header) with respect to transport acceleration operation therefrom. TA 120 may, upon determining that transport acceleration functionality is not to be implemented or thereafter, provide signaling to the UA (e.g., using the aforementioned QC-STA-response header) regarding not implementing transport acceleration.

If, however, none of the exclude conditions is satisfied processing according to the illustrated embodiment proceeds to block 223. At block 223 of the illustrated embodiment transport acceleration functionality is implemented with respect to the request. For example, logic of TA control 125 may operate to control a routing block of TA 120 to cause the request to be provided transport acceleration functionality, preferably stripping any signaling (e.g., the aforementioned QC-STA header) with respect to transport acceleration operation therefrom. Information provided in signaling from the UA, such as information provided by one or more of the aforementioned signaling keys (e.g., included in the aforementioned QC-STA header), may be utilized by the transport accelerator to implement transport acceleration functionality appropriate to the UA operation. TA 120 may, upon implementing transport acceleration functionality and/or in association therewith, provide signaling to the UA (e.g., using the aforementioned QC-STA-response header) regarding the initiation and/or operation of the transport acceleration.

Where it is determined that the content server does not support transport acceleration operation (e.g., when any of the foregoing exemplary conditions have failed), operation according to embodiments operate to dynamically add the content server to an exclude list (e.g., add a {server, resource} tuple, such as the (hostname, file_extension) tuple, to an exclude list), such as exclude list 126a. Thereafter, selective implementation of the transport acceleration functionality may be made with respect to such content servers based upon their inclusion in the exclude list, as described above.

Because conditions indicative of support for transport acceleration may change on a resource-by-resource basis, embodiments may operate to temporarily include the particular content server determined not to support transport acceleration operation in an exclude list. For example, when adding the content server to an exclude list in accordance with the above, embodiments may further note a timestamp or timer value (e.g., "Timer Value" in Table 6 above) for this entry in the exclude list. In operation according to embodiments, during the time a particular tuple is on the exclude list, requests to that content server will not be accelerated (i.e., transport acceleration functionality will be bypassed). However, once the exclude list timer expires, requests to the content server may be accelerated (e.g., depending upon the transport acceleration control analysis applied with respect thereto).

Although selected aspects have been illustrated and described in detail, it will be understood that various substitutions and alterations may be made therein without departing from the spirit and scope of the present invention, as defined by the following claims.

What is claimed is:

1. A method for transport acceleration request communication, the method comprising:

receiving, by a transport accelerator (TA), a content request via a first request acceleration port of the TA from a first user agent (UA), wherein the content request comprises a request for content data to be delivered to the UA by a content server;

analyzing the content request to determine if the content request includes signaling indicating that transport acceleration functionality is to be provided with respect to the content request, wherein the signaling indicating that transport acceleration functionality is to be provided comprises metadata utilized by the TA with respect to providing transport acceleration operation; and performing transport acceleration operation with respect to the content request based at least in part on a determination that the content request includes signaling indicating that transport acceleration functionality is to be provided, wherein the transport acceleration operation includes subdividing the content request into a plurality of requests for content, and controlling requesting the content from the content server by the TA to provide accelerated delivery of the requested content data to the TA.

2. The method of claim 1, further comprising:
passing another content request on to the content server by the TA without providing transport acceleration operation when it is determined that the another content request does not include signaling indicating that transport acceleration functionality is to be provided with respect to the another content request.

3. The method of claim 1, further comprising:
analyzing the content request to determine if transport acceleration functionality will be provided by the TA with respect to the content request, wherein the performing transport acceleration operation with respect to the content request is further based at least in part on a determination that transport acceleration functionality will be provided by the TA with respect to the content request.

4. The method of claim 3, further comprising:
passing another content request on to the content server by the TA without providing transport acceleration operation when it is determined that the another content request includes signaling indicating that transport acceleration functionality is to be provided with respect to the another content request but for which it is determined that transport acceleration functionality will not be provided by the TA with respect to the another content request.

5. The method of claim 4, wherein the passing the another content request on to the content server includes stripping the indication that transport acceleration functionality is to be provided with respect to the another content request.

6. The method of claim 3, wherein the analyzing the content request to determine if transport acceleration functionality will be provided by the TA comprises applying a set of rules to one or more attributes of the content request.

7. The method of claim 6, wherein the set of rules comprises an exclude list, wherein the exclude list includes at least one of a blacklisted server list or a request attribute exclude list.

8. The method of claim 7, wherein the exclude list comprises a plurality of black lists which are applied in a predetermined hierarchy.

9. The method of claim 1, wherein the metadata comprises at least one of information that the TA utilizes in the subdividing the content request into the plurality of requests for content, information that the TA utilizes in scheduling the plurality of requests for content, information that the TA utilizes to determine if implementation of the transport acceleration functionality is advantageous with respect to the content request, information that the TA utilizes to determine how one or more aspects of the transport acceleration functionality is to be implemented, information that the TA utilizes to determine a time at which to cancel one or more requests for content of the plurality of requests for content, information that the TA utilizes to select a preferred network interface for use with respect to one or more requests for content of the plurality of requests for content, or information that the TA utilizes to support a plurality of connections to the transport accelerator for a single content stream by the UA.

10. The method of claim 1, wherein the metadata comprises the information that the TA utilizes to determine how one or more aspects of the transport acceleration functionality is to be implemented, and wherein the one or more aspects of the transport acceleration functionality comprises an aspect selected from the group consisting of a chunk size of the plurality of requests, a bit rate for the requested content data, and an error correction implementation.

11. The method of claim 1, wherein the TA comprises the first request acceleration port and a second acceleration port, wherein the second acceleration port is in communication with a system framework providing one or more services, including transport acceleration, to UAs, and wherein the first UA in communication with the first request acceleration port is not utilizing the system framework and implements the signaling to request transport acceleration operation with respect to the content request.

12. The method of claim 1, wherein the signaling indicating that transport acceleration functionality is to be provided comprises a predetermined header for requesting transport acceleration, wherein the predetermined header includes one or more keys providing information for one or more attributes of the requested transport acceleration.

13. The method of claim 12, wherein the one or more keys are selected from the group consisting of:
fileType;
requestPriority;
streamingBitRate;
streamingPlaybackBuffer;
requestExpirationTime;
approxFileSize;
preferredNetworkInterface;
fastStartSize;
useHTTPS;
uniqueUAinstanceID;
UAPriority;
uniqueStreamID;
streamPriority;
streamBitRate;
streamPlaybackBuffer;
requestSoftExpirationTime;
requestUniqueID; and
requestPrerequisites.

14. The method of claim 12, wherein the performing transport acceleration operation comprises implementing the transport acceleration functionality in accordance with at least a portion of the information included in the one or more keys.

15. The method of claim 1, further comprising:
providing signaling to the first UA indicating whether or not transport acceleration functionality is being provided with respect to the content request.

16. The method of claim 15, wherein the signaling indicating whether or not transport acceleration functionality is being provided comprises a predetermined header for responding to requests for transport acceleration, wherein the predetermined header includes one or more keys providing information regarding implementation of the transport acceleration functionality.

17. The method of claim 16, wherein the one or more keys are selected from the group consisting of:
requestAccelerated;
requestEstimatedReceiveRate;
numberOfSupportedPriorities; and
usedHTTPS.

18. The method of claim 1, wherein the transport acceleration operation further includes stripping the indication that transport acceleration functionality is to be provided with respect to the content request.

19. An apparatus for transport acceleration request communication, the apparatus comprising:
means for a transport accelerator (TA) receiving a content request via a first request acceleration port of the TA from a first user agent (UA), wherein the content request comprises a request for content data to be delivered to the UA by a content server;
means for analyzing the content request to determine if the content request includes signaling indicating that transport acceleration functionality is to be provided with respect to the content request, wherein the signaling indicating that transport acceleration functionality is to be provided comprises metadata utilized by the TA with respect to providing transport acceleration operation; and
means for performing transport acceleration operation with respect to the content request based at least in part on a determination that the content request includes signaling indicating that transport acceleration functionality is to be provided, wherein the transport acceleration operation includes subdividing the content request into a plurality of requests for content, and controlling requesting the content from the content server by the TA to provide accelerated delivery of the requested content data to the TA.

20. The apparatus of claim 19, wherein the metadata comprises at least one of information that the TA utilizes in the subdividing the content request into the plurality of requests for content, information that the TA utilizes in scheduling the plurality of requests for content, information that the TA utilizes to determine if implementation of the transport acceleration functionality is advantageous with respect to the content request, information that the TA utilizes to determine how one or more aspects of the transport acceleration functionality is to be implemented, information that the TA utilizes to determine a time at which to cancel one or more requests for content of the plurality of requests for content, information that the TA utilizes to select a preferred network interface for use with respect to one or more requests for content of the plurality of requests for content, or information that the TA utilizes to support a plurality of connections to the transport accelerator for a single content stream by the UA.

21. The apparatus of claim 19, wherein the metadata comprises the information that the TA utilizes to determine how one or more aspects of the transport acceleration functionality is to be implemented, and wherein the one or more aspects of the transport acceleration functionality comprises an aspect selected from the group consisting of a chunk size of the plurality of requests, a bit rate for the requested content data, and an error correction implementation.

22. The apparatus of claim 19, wherein the TA comprises the first request acceleration port and a second acceleration port, wherein the second acceleration port is in communication with a system framework providing one or more services, including transport acceleration, to UAs, and wherein the first UA in communication with the first request acceleration port is not utilizing the system framework and implements the signaling to request transport acceleration operation with respect to the content request.

23. A non-transitory computer readable medium storing computer executable code for transport acceleration request communication, the non-transitory computer readable medium comprising:
a tangible computer-readable medium having program code recorded thereon, said program code comprising:
program code to receive, by a transport accelerator (TA), a content request via a first request acceleration port of the TA from a first user agent (UA), wherein the content request comprises a request for content data to be delivered to the UA by a content server; program code to analyze the content request to determine if the content request includes signaling indicating that transport acceleration functionality is to be provided with respect to the content request, wherein the signaling indicating that transport acceleration functionality is to be provided comprises metadata utilized by the TA with respect to providing transport acceleration operation; and
program code to perform transport acceleration operation with respect to the content request based at least in part on a determination that the content request includes signaling indicating that transport acceleration functionality is to be provided, wherein the transport acceleration operation includes subdividing the content request into a plurality of requests for content, and controlling requesting the content from the content server by the TA to provide accelerated delivery of the requested content data to the TA.

24. The computer readable medium of claim 23, wherein the metadata comprises at least one of information that the TA utilizes in the subdividing the content request into the plurality of requests for content, information that the TA utilizes in scheduling the plurality of requests for content, information that the TA utilizes to determine if implementation of the transport acceleration functionality is advantageous with respect to the content request, information that the TA utilizes to determine how one or more aspects of the transport acceleration functionality is to be implemented, information that the TA utilizes to determine a time at which to cancel one or more requests for content of the plurality of requests for content, information that the TA utilizes to select a preferred network interface for use with respect to one or more requests for content of the plurality of requests for content, or information that the TA utilizes to support a plurality of connections to the transport accelerator for a single content stream by the UA.

25. The computer readable medium of claim 23, wherein the metadata comprises the information that the TA utilizes to determine how one or more aspects of the transport acceleration functionality is to be implemented, and wherein the one or more aspects of the transport acceleration functionality comprises an aspect selected from the group consisting of a chunk size of the plurality of requests, a bit rate for the requested content data, and an error correction implementation.

26. An apparatus for transport acceleration request communication, the apparatus comprising at least one processor; and
- a memory coupled to said at least one processor, wherein said at least one processor is configured:
- to receive, by a transport accelerator (TA), a content request via a first request acceleration port of the TA from a first user agent (UA), wherein the content request comprises a request for content data to be delivered to the UA by a content server;
- to analyze the content request to determine if the content request includes signaling indicating that transport acceleration functionality is to be provided with respect to the content request, wherein the signaling indicating that transport acceleration functionality is to be provided comprises metadata utilized by the TA with respect to providing transport acceleration operation; and
- to perform transport acceleration operation with respect to the content request based at least in part on a determination that the content request includes signaling indicating that transport acceleration functionality is to be provided, wherein the transport acceleration operation includes subdividing the content request into a plurality of requests for content, and controlling requesting the content from the content server by the TA to provide accelerated delivery of the requested content data to the TA.

* * * * *